Dec. 12, 1961 J. H. SCHWALBE ET AL 3,013,207
MUZZLE VELOCITY MEASURING SYSTEM
Filed July 21, 1954 2 Sheets-Sheet 1

INVENTORS
HERBERT E. MEYER, JR.
JULIAN H. SCHWALBE
BY
R. J. Craddock
ATTORNEY

United States Patent Office 3,013,207
Patented Dec. 12, 1961

3,013,207
MUZZLE VELOCITY MEASURING SYSTEM
Julian H. Schwalbe, Franklin Square, and Herbert E. Meyer, Jr., Manhasset, N.Y., assignors to Sperry Rand Corporation, a corporation of Delaware
Filed July 21, 1954, Ser. No. 444,688
4 Claims. (Cl. 324—68)

This invention relates to the measurement of the velocity of objects. More particularly, the invention concerns, in one sense, an improved system for providing a continuous measurement of the muzzle velocities of projectiles fired from one or more guns. In a further sense, the invention concerns a novel pressure-actuated switching element uniquely well-adapted for use in the aforementioned muzzle-velocity measuring system.

The direction in which a gun is pointed with respect to its target depends in part on the muzzle velocity of the projectiles fired from the gun. Hence, if the muzzle velocity for the gun varies, and all other ballistic factors determining the proper direction of the gun with respect to its target remain constant (such as wind velocity and the elevation and range of the target), the direction of the gun nevertheless must be adjusted as a function of the changes in muzzle velocity in order for the gun to perform accurately. These velocity changes occur in varying degrees in all guns, being particularly noticeable in guns of the rapid-firing type, and depend on conditions such as ammunition temperature, manufacturing variations in ammunition, and the number of rounds fired over a given period.

In view of the foregoing, it will be appreciated that a continuous measurement of muzzle velocity is often desirable for detecting departures of such velocity from a given value employed as a reference for pointing the gun so that the pointing of the gun may be altered accordingly.

A number of different measurement schemes have been employed heretofore, including schemes involving the use of certain types of sensing devices mounted on or adjacent to a gun barrel for measuring the time required for a projectile to move through a fixed distance in the barrel. Chief among the sensing devices heretofore used have been projectile sensing coils, strain gauges and magnetostriction devices.

A pair of projectile sensing coils may, for example, be mounted on a flash hider near the muzzle of a gun barrel so that the inductance of each coil is changed as a projectile passes through the same. The time between the two inductance changes is a measure of the projectile muzzle velocity. However, the slow rate of rise of the signal makes accurate measurement of muzzle velocity by this arrangement exceedingly difficult. Strain gauges and magnetostriction devices are likewise disadvantageous for this reason, while also being poor choices due to their fragility, the difficulty of protecting them from high barrel temperatures and the difficulty of their distinguishing between desired signals and noise.

By the present invention, however, a muzzle velocity measuring system of exceptionally high accuracy is provided involving the use of sensing devices devoid of the disadvantages inherent in the above-noted prior art devices. More specifically, the sensing devices proposed herein are novelly-constructed pressure-switches, at least one of which is mounted on the gun barrel at the muzzle end while at least another is mounted on the gun barrel at the breech end. Orifices are drilled through the gun barrel wall, and a pressure-switch is operatively mounted in communication with each orifice. The pressure of the propelling gas immediately behind the fired projectile (sensed through the barrel orifices) deflects a diaphragm element, forming the movable contact of the switch against a fixed contact, thus closing the switch. The time between the closings of a breech-mounted switch and a muzzle-mounted switch is then measured to furnish an indication of the projectile's muzzle velocity.

In order to measure the time interval between breech and muzzle switch closings, thus securing a measuring of muzzle velocity, a novel time measuring system incorporating the aforementioned switches is provided. In brief, the system supplies an indication of departures of average muzzle velocity from a reference muzzle velocity, and includes a provision for temporarily eliminating the averaging process during a period when muzzle velocity ordinarily undergoes its greatest change.

Means are also provided for assuring that the time measurements made for successive projectiles start anew with the respective closings of the breech switch or switches by each of the projectiles. Further means are provided for assuring that the indication of average muzzle velocity occuring immediately following the firing of the last round of a series of rounds is retained until firing is recommenced. Moreover, the system is so arranged that it is capable, without modification, other than the addition of more muzzle and breech switches, of producing an indication of the average muzzle velocity of a battery of similar, concurrently firing guns.

An object of the present invention is to provide a novel system responsive to the time that elapses between successive closings of two pressure-actuated switches operatively communicating with the bore of a gun barrel at opposite ends thereof for supplying an indication of the muzzle velocity of a projectile, the propelling gas behind which causes the successive closings of the switches.

Another object is the provision of a system in accordance with the foregoing object further capable of supplying an indication of the average muzzle velocity of a plurality of projectiles fired in rapid succession.

Another object is to provide a novel pressure-actuated switch device uniquely well-adapted for use in the muzzle-velocity indicating systems of the foregoing objects.

With the foregoing and still other objects in view, the invention includes the novel combinations and arrangements of elements described below and illustrated in the accompanying drawings, in which.

Figure 1:
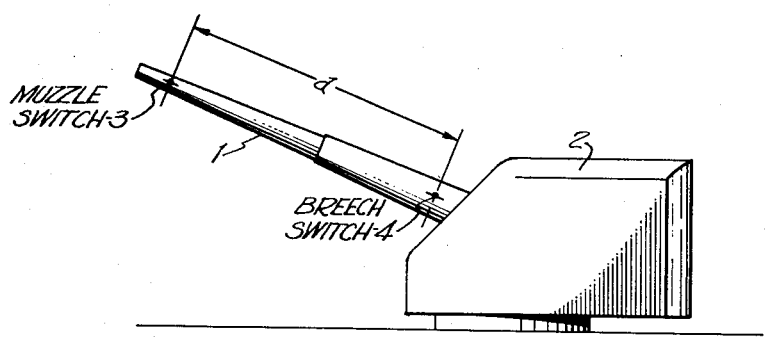
FIG. 1 is a schematic illustration of a gun, the bore of which is in operative communication with a pair of pressure-actuated switches spaced a given distance $d$ apart.

Referring to FIG. 1, a gun barrel 1 mounted in a gun mount 2 is provided with a pair of pressure-actuated switches 3, 4 arranged operatively to communicate with the bore of barrel 1. The switches are spaced apart a preselected distance $d$ axially of barrel 1, switch 4 being located near the breech-end of the barrel while switch 3 is located near the muzzle-end of the barrel. Switches 3, 4 are normally open, and are closed only for intervals when the pressure to which they are subjected equals or exceeds a given valve corresponding to the lowest expected value of propelling pressure behind projectiles fired through barrel 1. The muzzle velocity of any one of these projectiles is proportional to the distance $d$ divided by the time that elapses between the successive operation by the projectile of switch 4 and switch 3. Hence, this elapsed time is inversely proportional to the muzzle velocity of the projectile.

Figure 2:
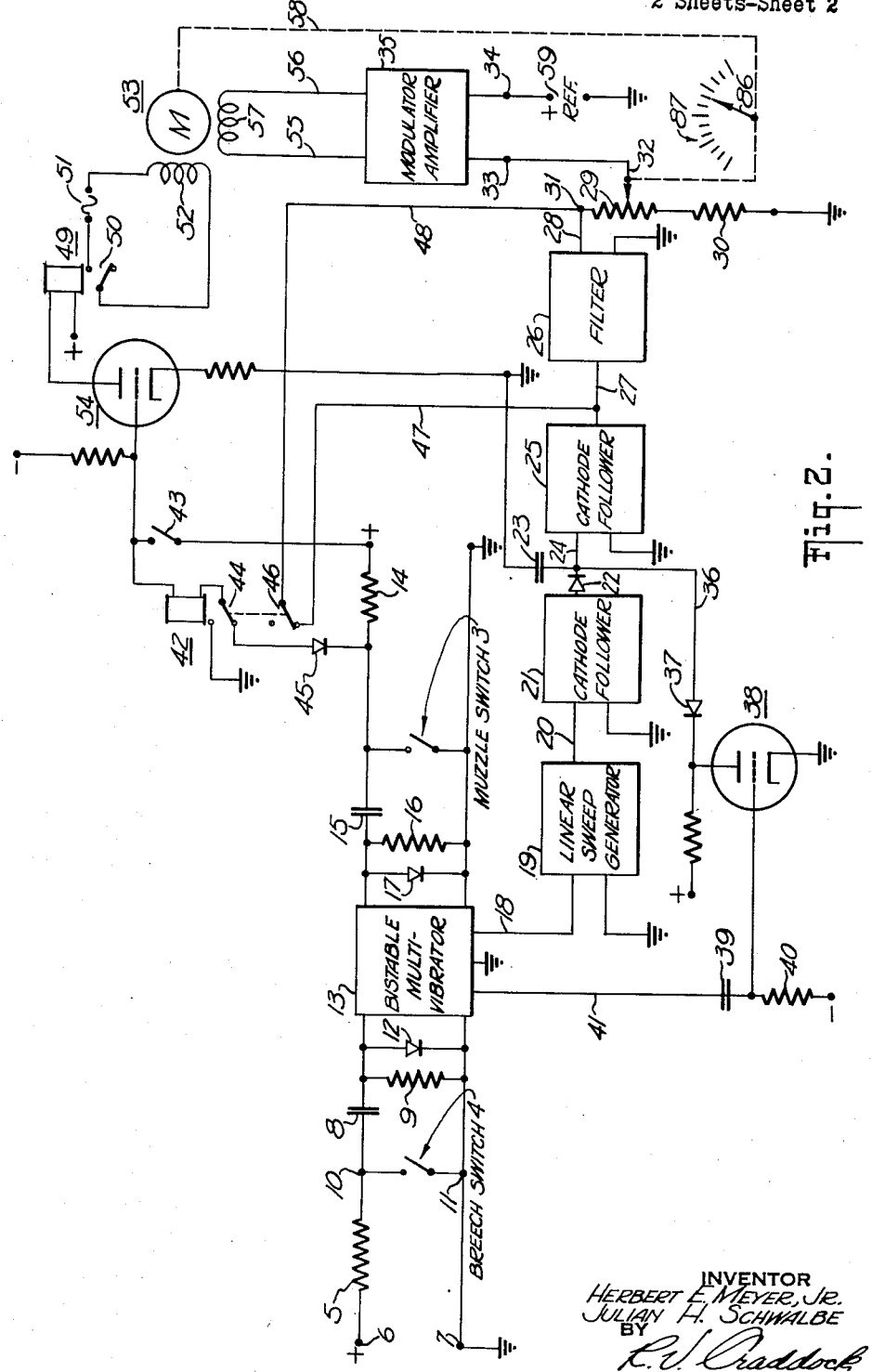
FIG. 2 is a system schematic diagram of the present invention.

FIG. 2 illustrates a preferred arrangement for electronically measuring the elapsed time between the operation of pressure-actuated switches 3, 4 and for providing an indication therefrom of the average muzzle velocity of a plurality of projectiles fired in rapid succession through gun barrel 1.

Switch 4 is arranged upon closing to connect a resistor 5 in circuit with a source of direct current across supply terminals 6, 7, the latter of which is grounded. The current thus caused to flow in resistor 5 is differentiated by a capacitance-resistance differentiating network formed by capacitor 8 and resistor 9 connected across terminals 10, 11 of switch 4. By this arrangment, a negative pulse of duration equal to the time the switch 4 remains closed is produced, whereupon such pulse is differentiated for supplying a short negative pulse at the instant only of the switch closing followed by a short positive pulse at the instant of the switch's opening. A rectifier element 12 connected across resistor 9 by-passes the short positive pulse to ground so that one input channel of a multi-vibrator 13 also connected across resistor 9 receives only short negative pulses representing successive closings of switch 4.

Similar short negative pulses representing successive closings of switch 3 (located near the muzzle of the gun barrel) are produced by an arrangement substantially identical to the arrangement described for switch 4. That is to say, the switch 3 serves to close a D.C. circuit containing a resistor 14, and the current thus caused to flow in resistor 14 is differentiated by a differentiating network formed by a capacitor 15 and a resistor 16, the positive short pulses being shorted out by a rectifier element 17 connected across resistor 16. The short negative pulse appearing across resistor 16 are then connected to a second input channel of multi-vibrator 13 so as to provide a second input for this device.

Multi-vibrator 13 has two stable conditions of operation. In one stable condition, the multi-vibrator produces no voltage across its output lead 18 and ground, and in its other stable state produces a negative voltage of substantially constant magnitude. Initially, multi-vibrator 13 is in its no-output state; but, on the supplying of a short negative pulse thereto by the operation of switch 4, it is switched to its negative voltage output state. The short negative pulse subsequently produced by the operation of switch 3 then returns the multi-vibrator to its initial no-output state so that between the operation of switch 4 and switch 3, respectively, multi-vibrator 13 produces across its output lead 18 and ground a negative square wave voltage or gate voltage of duration equal to the elapsed time between the closing of the respective switches.

The gate voltage on lead 18 is fed to a linear sweep generator 19 which is arranged in a well-known manner to produce across its output lead 20 and ground a voltage which increases linearly from zero for the duration of its gate voltage input. In this fashion, a peak voltage is obtained across lead 20 and ground of a magnitude proportional to the elapsed time between the respective closings of switch 4 and switch 3. The peak voltage on lead 20 is fed via a cathode follower 21, providing a low impedance source, to a charging diode 22 connected through a capacitor 23 to ground. Capacitor 23 quickly charges to the peak voltage, and is capable of retaining this charge at least until breech switch 4 normally again closes due to the firing of the next succeeding projectile. The peak voltage charge on capacitor 23 is fed via a lead 24 and an isolation cathode follower 25 to a filter 26 having an input lead 27. Filter 26 is arranged to smooth the successive peak voltages it receives and to produce across its output lead 28 and ground a voltage which is substantially an average of said peak voltages. This average voltage output is placed across a serially-connected variable potentiometer 29 and fixed resistor 30 by connecting lead 28 to one outer terminal 31 of the potentiometer-resistance combination, the other terminal of which is connected to ground.

Potentiometer 29 is provided with a wiper 32 which is connected ultimately to ground via the input terminals 33, 34 of a modulator-amplifier 35 in series with a source 59 of direct current reference voltage equal to the voltage drop produced by lead 28 between wiper 32 and ground (in the centered position of wiper 32 as shown) at a given or average reference muzzle velocity. By opposing the polarity of the serially-connected reference voltage with respect to the polarity of the average voltage on lead 28, the voltage across modulator-amplifier terminals 33, 34 is equal to the difference between the reference voltage and the aforesaid voltage drop between wiper 32 and ground. Thus, if the average muzzle velocity of the projectiles successively fired through the gun barrel differs from the given value thereof corresponding to the reference voltage, a differential D.C. voltage appears across terminals 33, 34 for providing a proportional A.C. voltage in the output of modulator-amplifier 35 of phase dependent on the polarity of said D.C. voltage.

The output of modulator-amplifier 35 is connected via leads 55, 56 to the control-field winding 57 of a reversible two-phase servomotor 53 having a fixed-field winding 52 supplied from an A.C. voltage source 51 of constant amplitude and phase. Servomotor 53 is connected by a mechanical connection 58 to position wiper 32 of potentiometer 29. By this arrangement, wiper 32 is positioned, when the actual average muzzle velocity differs from its reference value, so as to equalize the voltage produced by lead 28 across ground and wiper 32 with the reference voltage supplied from source 59. The distance wiper 32 is moved to eliminate the voltage difference is proportional to the difference between the actual average muzzle velocity and the reference muzzle velocity, while the direction of movement depends on which of the muzzle velocities is the greater. Accordingly, mechanical connection 58 is also connected to drive a pointer 86 co-operating with a muzzle velocity calibrated dial 87 having a mid-scale reading of the reference muzzle velocity, thereby to furnish a direct indication of departures of the actual average muzzle velocity above and below the reference value thereof.

Preferably, capacitor 23 is permitted to store the peak voltage produced by a projectile only until the next succeeding projectile initiates a new sweep by the closing of switch 4, since it is possible that the peak produced by the succeeding projectile might have a lesser value than the preceding peak voltage. Accordingly, means are provided for discharging capacitor 23 with the beginning of each succeeding sweep. To perform this function, a discharge path for capacitor 23 is provided by a lead 36 connected through a diode 37 and an electronic switch, preferably a triode 38, to ground. Triode 38 is normally biased to cut-off by a negative bias furnished to its grid, but is rendered conductive for the duration of a short positive pulse supplied to said grid from the output of a differentiating network formed of a capacitor 39 and resistor 40, a positive gate input voltage for which is obtained from multi-vibrator 13 via a second output lead 41 simultaneously with the negative gate supplied by the multi-vibrator on lead 18. By this arrangement, capacitor 23 stores the peak voltage produced by one projectile until the next succeeding projectile closes breech switch 4, thereby to close the electronic switch 38 for an instant to discharge capacitor 23 to ground in preparation for storing the peak voltage produced by said next succeeding projectile.

The muzzle velocity of projectiles fired from a gun barrel generally experiences its greatest variation when the gun is first fired, and thereafter settles down to a state where its variations are relatively smaller. As is common with smoothing filters such as filter 26, the smoothing process introduces a time lag. The lag of filter 26 is small enough to cope with the smaller variations in muzzle velocity that normally occur subsequent to the firing of the first round, but is unable effectively to cope with the large preceding variation. Hence, filter 26 is shorted out of the system until the first round is fired whereby the peak voltage produced by the first round only is fed directly to the differential voltage combining means 29, 30. To accomplish this operation, the winding of a relay 42 is connected via a switch 43, a holding contact element 44 and a blocking diode 45 across resistor 14. Switch 43, hereinafter termed "firing switch," is closed by the operator when firing is to commence, whereupon relay 42 is operated by the closing of pressure-actuated switch 3 in the muzzle of the gun barrel as the first projectile passes the same. Upon operation, relay 42 grounds itself through contact element 44 and operates another contact element 46 to open a bypass circuit around filter 26 formed by leads 47, 48, thus placing filter 26 in the system for all subsequent rounds.

After the firing of the last round, capacitor 23 tends indefinitely to store the peak voltage produced by that round, there being no succeeding round to discharge the capacitor to ground through triode 38. However, sufficient leakage of the charge on capacitor 23 occurs that this charge appreciably diminishes over a relatively long period so as to make it appear that the muzzle velocity is gradually increasing when in fact no projectiles are being fired. Hence, it is desirable to arrest the position of wiper 32 at the position it occupied with the firing of the last round, thus to prevent the formation of an erroneous differential voltage across modualtor-amplifier input terminals 33, 34. To accomplish this, a relay 49 is provided having a contact element 50 arranged on energization of relay 49 to connect the source of alternating current 51 to the fixed field 52 of reversible two-phase servomotor 53. Relay 49 is connected in the plate circuit of a triode 54 which is rendered conductive over a negative bias on its grid by the closing of firing switch 43. Hence, when firing switch 43 is opened to cease fire, the plate current flowing through triode 54 for energizing relay 49 is cut off, thereby to open fixed-field 52 of motor 53 for preventing further operation of the latter in response to the output of modulator-amplifier 35.

Figure 3:
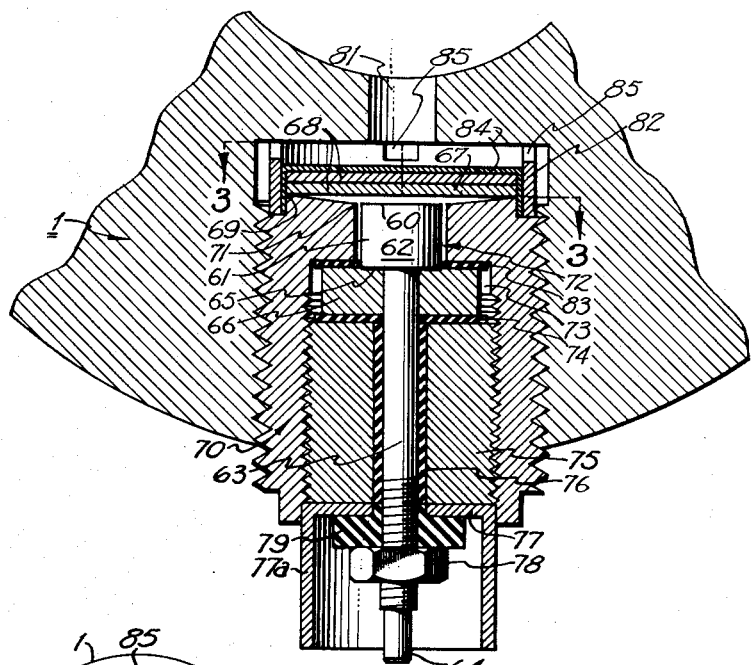
FIG. 3 is a side-elevation view, partly in section, of the pressure-actuated switch of the present invention installed in the wall of a gun-barrel.
Figure 4:
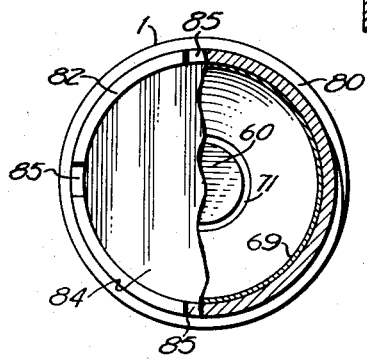
FIG. 4 is a view of the switch taken on the line 3—3 of FIG. 3.

Switches 3, 4 of FIGS. 1 and 2 are each preferably of the form of the switch illustrated in FIGS. 3 and 4, now to be described. The switch is provided with a substantially flat fixed-contact surface 60 forming the end face of one end-portion or head-portion 61 of a cylindrical rod-like member 62. The other end-portion 63 of member 62 is of reduced diameter and is fashioned at its outer extremity into a connector pin 64 by which connection is made from the switch to the remainder of the system. A shoulder 65 is formed where end-portions 61, 63 meet, and a rigid washer-like element 66 is fitted on to reduced end-portion 63 so that shoulder 65 rests thereon.

A movable-contact surface cooperating with surface 60 is formed by one of the outer surfaces 67 of a diaphragm element 68 comprising a pair of circular or disc-like diaphragms placed one atop the other for providing element 68 with a sufficiently high degree of resilient stiffness so as to deform only for the duration of the propellant pressure imparted to it. Surface 67 is simply supported upon its peripheral edge by resting the same on the greater diameter rim 69 of a gently sloping concave end-face formed in the fashion of a frustum of a right-circular cone in a body portion 70 of the switch. The lesser diameter rim of the frusto-conical concave end-face also forms an end-rim 71 of a passage 72 extending completely through body portion 70 axially thereof and of the concave end-face. Passage 72 is of stepped diameter, having a greater diameter end-portion 73 remote from end-rim 71, and is partially threaded for purposes presently to be described. End-portion 73 is slightly larger in diameter than washer-like element 66, while the smaller diameter portion of passage 72 is slightly larger than the diameter of head-portion 61 of rod-like member 62.

On assembly, rod-like member 62 and washer-like element 66 are axially inserted freely into passage 72 so that head-portion 61 of member 62 is principally located in the smaller diameter end-portion of passage 72, while element 66 and the remainder of member 62 is located in end-portion 73 of larger diameter. A washer-like piece 83 of insulating or dielectric material such as a mica, for example, is placed between element 66 and the shoulder formed in body portion 70 at the junction of the lesser and greater diameters of passage 72 for electrically isolating element 66 from the body portion. A similar piece 74 of dielectric material is placed in contact with the other surface of element 66 for electrically isolating the same from an externally threaded bushing 75 which is screwed into the threaded end portion 73 of passage 72 so as to clamp element 66 securely to body portion 70 between insulating pieces 83, 74. An inner sleeve 76 of dielectric material prevents rod-like member 62 from coming into electrical contact with bushing 75.

The axial length of head portion 61 of rod-like member 62 is such that its contact surface 60 is substantially coplanar with the plane of end-rim 71 of passage 72. Hence, surface 60 normally resides in spaced-parallel relation to diaphragm contact surface 67.

The end-face of bushing 75 remote from washer-like element 66 abuts the base 77 of a male connector element of which connector pin 64 forms one terminal, while base 77 and a cylindrical surface 77a extending therefrom form the other terminal, rod-like member 62 freely passing through an aperture in the base. Member 62 is threaded proximate to the connector element and a nut 78 is screwed onto the threads so as to clamp connector base 77 securely against bushing 75 through a washer 79 of dielectric material which maintains the electrical isolation of member 62 from body portion 70. The male connector element cooperates with a female connector element (not shown) for electrically connecting the switch into the system of FIG. 2.

Body portion 70 is of a generally cylindrical configuration with passage 72 running axially of its length. Screw threads are supplied on the outer cylindrical surface of the body portion so that the latter may be screwed into a partially threaded receptacle 80 provided in gun barrel 1 and extending laterally of the bore of the barrel. Receptacle 80 preferably terminates short of the bore itself, but the bore is placed in communication with the receptacle by a coaxial orifice 81 of reduced diameter through which the pressure of the bore is imparted to diaphragm element 68.

Diaphragm element 68 is spaced a selected axial distance from orifice 81 by a collar 82 around rim 69 which serves also to clamp a gas-tight canister-like cover 84 over the diaphragms so as to prevent the corrosive gases in barrel 1 from coming in actual contact with the switch surfaces formed by fixed-contact surface 60 and movable-contact surface 67. The inner surface of the base of cover 84 rests on the upper surface of diaphragm element 68 as viewed in FIG. 3, while the side-wall of cover 84 extends downwardly along body portion 70 a short distance below surface 67 of element 68. Collar 82 is preferably shrunk-fit around the cover wall, thus clamping both cover 84 and diaphragm element 68 securely in place. Cover 84 is of a non-corrosive material and adds negligible stiffness to the resiliency of diaphragm element 68. A plurality of holes 85 in collar 82 serve to equalize gas pressure externally and internally of the collar so that the clamping action of the latter is not adversely affected by unbalanced pressure within the collar.

All parts of the switch assembly, except those parts specified as being of dielectric material, are electrically conductive. Therefore, upon diaphragm element 68 being pressure-deflected into contact with surface 60, the electrical isolation of connector pin 64 relative to connector surface 77a is eliminated, and the switch is closed for the duration of the contact between element 68 and surface 60.

The frusto-conical concavity of the diaphragm-supporting end-face of body portion 70 is of major significance insofar as the successful operation of the switch is concerned. The slope of the conical walls is such that they provide a firm seat for diaphragm surface 67 when it is deflected toward fixed-contact surface 60, avoiding any possibilty of permanent deformation of the diaphragm element under projectile propelling pressures which commonly range from 10,000 p.s.i. to 30,000 p.s.i. Moreover, besides providing a seat preventing permanent deformation of surface 67, the frusto-conical end-face provides a means for insuring that a firm positive contact is made between fixed-contact surface 60 and surface 67 over the entire area of surface 60 upon deflection of surface 67. That is to say, on deflection, surface 67 is forced to conform with the frusto-conical contour of the end-face so as to make the best possible contact with fixed-contact surface 60.

While in the system schematic of FIG. 2, the switch shown in detail in FIGS. 3 and 4 is employed only twice, first as breech switch 4 and second as muzzle switch 3, it will be readily apparent that the system functions in a substantially identical manner when a plurality of breech switches 4 in parallel is employed with a plurality of muzzle switches 3 in parallel. Such an arrangement is desirable, for instance, in determining the average muzzle velocity of projectiles fired from one gun barrel where due to wobble of the projectile in the barrel, the propelling pressure entering the lateral orifice leading to one muzzle switch might be less than the full value of such pressure available diagonally across the bore, for example, at the instant the projectile passes the orifice. In this event, the closing of the lone muzzle switch is delayed beyond the instant of passing, resulting in an erroneous indication of muzzle velocity. However, by placing more than one muzzle switch in communciation with respective orifices whose axes lie in the same lateral plane transverse of the bore, the closing of at least one such muzzle switch at the instant of the passing of a projectile is assured. The first muzzle switch to close operates to switch the bistable multi-vibrator 13 off, the subsequent closing of the other muzzle switch or switches having no effect, since the multi-vibrator is already switched off and such subsequent closing occurs before the firing of the next projectile which switches multi-vibrator 13 on. By similarly arranging a plurality of breech switches, the closing of at least one breech switch at the instant of the passing of a projectile is assured notwithstanding projectile wobble. In this case, the first breech switch to close operates to switch multi-vibrator 13 on, the subsequent closing of the other breech switch or switches having no effect, since the multi-vibrator is already switched on and such subsequent closing occurs before the projectile passes the muzzle switches which switch multi-vibrator 13 off.

Another instance where it is desirable to employ respective pluralities of parallel-connected muzzle switches and parallel-connected breech switches is in the case of a battery of similar guns where the average muzzle velocity of the battery is a good indication of the average muzzle velocity of each of the individual guns. By mounting one muzzle switch and one breech switch on each gun barrel, a random sampling of the muzzle velocity of the battery is obtained and averaged. That is to say, the first round fired by the battery switches multi-vibrator 13 on and off to produce a peak voltage representing the muzzle velocity of that round. A second round fired by the battery before the multi-vibrator is switched off has no effect, since the multi-vibrator is already switched on when the second round passes its breech switch and is already switched off when this round passes its muzzle switch. However, if the third round fired by the battery passes its breech switch when multi-vibrator 13 is switched off, then the third round produces a second peak voltage representing the muzzle velocity of that round. Filter 26 then averages the peak voltages, or muzzle velocities, of the first and third rounds. In this fashion, the muzzle velocities for each gun barrel are measured at random intervals depending on how often the rounds fired from that barrel trip multi-vibrator 13 from one stable state to the other.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A system for providing a measure of the muzzle velocity of a projectile fired through a gun barrel, said system comprising a first switch mounted on said gun barrel and arranged to be closed by pressure in the barrel exceeding a given pressure, means controlled by said first switch for supplying a voltage which increases from a given value linearly with respect to time upon the closing of said first switch, a second switch mounted on said gun barrel and arranged to be closed by pressure in the barrel exceeding said given pressure, said second switch being spaced from said first switch a predetermined distance nearer the muzzle of said gun barrel, and means controlled by said second switch upon the closing thereof for halting further increase of said linearly increasing time voltage so that the latter reaches a peak value proportional to the elapsed time between the closings of said first and second switches, said given pressure being greater than the maximum pressure developed in front of said projectile as it passes through said gun barrel, whereby said first and second switches are closed by the pressure developed behind said projectile and said peak voltage value is inversely proportional to the projectile's muzzle velocity.

2. A system for providing a measure of the average muzzle velocity of a plurality of projectiles fired in rapid succession through a gun barrel, said system comprising a pair of pressure-actuated switches mounted on said gun barrel a selected distance apart axially of said barrel so as successively to be closed by the propellant pressure behind each projectile, said switches respectively including resilient means for maintaining them open so long as the pressure to which they are subjected is less than said propellant pressure, means controlled by the closing of the switch nearer the breech end of said barrel for supplying a voltage which increases from a given value linearly with respect to time, means controlled by the closing of the switch nearer the muzzle end of said barrel for halting further increase of said voltage so that the latter reaches successive peak values respectively proportional to the elapsed times between successive closings of said switches, means connected to said voltage supplying means for storing the peak voltage supplied for each projectile until the next following projectile passes said breech-proximate switch, and filter means connected to said storing means for providing an output dependent on the average value of the successive peak voltage outputs of said storing means, whereby the output of said filter means is inversely proportional to the average muzzle velocity of said projectiles.

3. A system for providing a measure of the muzzle velocity of a projectile fired through a gun barrel, said system comprising a first D.C. circuit including a first switch mounted on said gun barrel and arranged to be closed by the pressure of gases behind said projectile as the projectile passes said first switch, first means for differentiating the current caused to flow in said first circuit by the closing of said first switch, a second D.C. circuit including a second switch mounted on said gun barrel and arranged to be closed by the pressure of gases behind said projectile as the projectile passes said second switch, said second switch being spaced from said first switch a predetermined distance nearer the muzzle of said gun barrel, second means for differentiating the current caused to flow in said second circuit by the closing of said second switch, means connected to said first and second differentiating means and responsive to the outputs thereof for producing a pulse of duration equal to the interval between closings of said first and second switches, linear sweep generating means connected to said pulse-providing means and responsive to the output thereof for providing a potential output that increases from a given value linearly with respect to time for the duration of said pulse, means including a capacitor connected to said sweep generating means for providing a sustained output equal to the peak value of said linearly increasing potential output, a source of reference potential equal to said peak potential at a given muzzle velocity, and means connected to said capacitor-including means and said reference source for differentially combining said peak and reference potentials, the difference in said outputs being a measure of the difference between said given muzzle velocity and the muzzle velocity of the projectile actuating said first and second switches.

4. A system for supplying to a utilization device a measure of the muzzle velocity of a plurality of projectiles fired in rapid succession through a gun barrel, said system comprising a pair of pressure-actuated switches mounted on said gun barrel a selected distance apart axially of said barrel so as successively to be closed by the propellant pressure behind each projectile, said switches respectively including resilient means for maintaining them open so long as the pressure to which they are subjected is less than said propellant pressure, means controlled by the closing of the switch nearer the breech end of said barrel for supplying a voltage which increases from a given value linearly with respect to time, means controlled by the closing of the switch nearer the muzzle end of said barrel for halting further increase of said voltage so that the latter reaches successive peak values respectively proportional to the elapsed times between the successive closings of said switches, means connected to said voltage supplying means for storing the peak voltage supplied for each projectile until the next following projectile passes said breech-proximate switch, said peak voltage storing means being coupled in its output to said utilization device, voltage averaging means, means actuated by the first closing of said muzzle-proximate switch and remaining actuated thereafter for interposing said voltage averaging means in the coupling between said utilization means and said peak voltage storing means, whereby subsequent to the firing of the first of said plurality of projectiles said utilization device is supplied with a voltage inversely proportional to the average muzzle velocity of said projectiles.

References Cited in the file of this patent
UNITED STATES PATENTS

| | | |
|---|---|---|
| 2,301,192 | Bradford | Nov. 10, 1942 |
| 2,582,483 | Hallerberg | Jan. 15, 1952 |